US012620370B2

(12) United States Patent
Bellers et al.

(10) Patent No.: US 12,620,370 B2
(45) Date of Patent: May 5, 2026

(54) GAMMA ADJUSTMENT FOR VIDEO DISPLAY

(71) Applicant: Roku, Inc., San Jose, CA (US)

(72) Inventors: Erwin Ben Bellers, Fremont, CA (US); Steve Shawjong Liu, Mountain View, CA (US); Hsiangyao Shih, Hsinchu (TW)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/779,299

(22) Filed: Jul. 22, 2024

(65) Prior Publication Data

US 2026/0024508 A1 Jan. 22, 2026

(51) Int. Cl.
*G09G 5/10* (2006.01)

(52) U.S. Cl.
CPC ....... *G09G 5/10* (2013.01); *G09G 2320/0673* (2013.01); *G09G 2320/08* (2013.01)

(58) Field of Classification Search
CPC ............. G09G 5/10; G09G 2320/0673; G09G 2320/08
See application file for complete search history.

(56) References Cited

U.S. PATENT DOCUMENTS

2014/0375704 A1* 12/2014 Bi ........................ G09G 3/3275 345/694
2016/0180809 A1* 6/2016 Mickelsen ............... G09G 5/00 345/207
2017/0127034 A1* 5/2017 Urisaka .................. H04N 23/82
2019/0114971 A1* 4/2019 Choi .................... G09G 3/3266
2020/0380938 A1* 12/2020 Greenebaum ............ G09G 5/06
2023/0029431 A1* 1/2023 Xu ..................... G06V 40/1318
2023/0143803 A1* 5/2023 Lee ...................... G09G 3/2011 345/690

OTHER PUBLICATIONS

Chen, et al., "Optimizing TV Gamma and Correlated Color Temperature Settings for Enhanced Viewer Satisfaction: A Comprehensive Study on Backlight Brightness and Color Gamut Influences," Department of Photonics, National Yang Ming Chiao Tung University and Roku Inc., The Society for Information Display, Technical Sessions: Session 11: Display Quality (Applied Vision), https://doi.org/10.1002/sdtp.17009, Jun. 27, 2024, 4 pages.

* cited by examiner

*Primary Examiner* — Rodney Amadiz
(74) *Attorney, Agent, or Firm* — Akona IP PC

(57) ABSTRACT

A display system adjusts gamma based on the brightness setting of a display screen, which may provide an improved viewer experience. A standard decoding gamma of 2.2 may no longer be the most comfortable for a user on modem, brighter displays. Using a higher gamma when the display screen is set to a high brightness can improve viewer experience. A display system determines a brightness setting of a screen and applies a gamma adjustment to content for display based on the brightness setting. If the display brightness changes, the gamma adjustment may also change.

20 Claims, 10 Drawing Sheets

GAMMA ADJUSTMENT FOR VIDEO DISPLAY

TECHNICAL FIELD

This disclosure relates generally to display devices and systems, and more specifically, to techniques for adjusting display settings to improve viewer experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
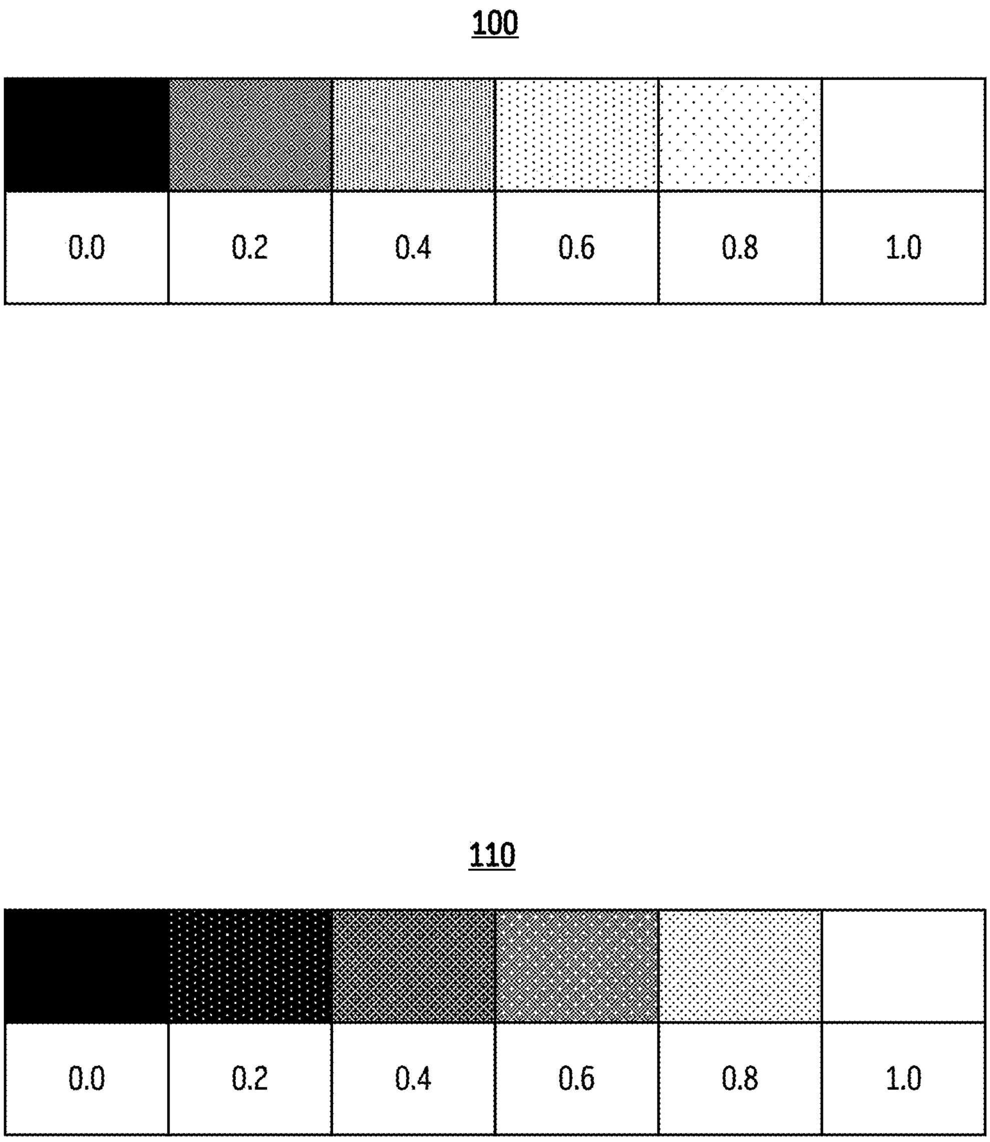
FIG. 1 depicts two example brightness scales, according to some embodiments of the present disclosure.

Image data is typically broken down into smaller elements called pixels. Each pixel represents one color in a specific location of the screen. An image presented on a full high-definition screen (i.e., 1920×1080) will contain millions of these pixels. The pixels are often encoded in terms of an RGB triplet. In an RGB triplet, each component corresponds to red, green, or blue; each component can vary from zero to a defined maximum value. A higher value indicates a higher brightness for a particular color within the pixel.

Display devices include various settings that can be tuned to improve user experience. Typical user-adjustable display settings, among others, include brightness, contrast, color temperature, and sharpness. Contrast describes the difference between the darkest and lightest parts of an image. A higher contrast enhances the distinction between light and dark areas, which can improve image depth and clarity. Color temperature describes the warmth or coolness of the display's color tone; a warm temperature causes images to appear more yellow, while a cool temperature causes images to appear more blue. Sharpness modifies the clarity and detail of the image. A higher sharpness can make edges appear crisper, but a high sharpness can also introduce visual artifacts.

In the context of display settings, brightness describes the overall light output of the display. For example, in a liquid crystal display (LCD), the strength of the backlight impacts the brightness of the display. Display screens can often be dimmed based on user preference and/or environment. A higher brightness makes the screen lighter, which is suitable for well-lit environments, while lower brightness makes the screen darker, which is easier on viewers' eyes in darker rooms. Display brightness is often measured in candelas per square meter, also referred to as nits. Other measures of luminance may be used to objectively define brightness of a display.

Some displays provide a user-adjustable gamma, also referred to as gamma correction. Gamma encoding or gamma correction defines the relationship between a pixel's numerical value and its actual luminance. Human perception of brightness is not linearly related to actual brightness, e.g., the number of photons emitted by a display. For example, when a digital camera captures an image, when twice the number of photons hit the camera sensor, the sensor receives twice the signal. The image data and the number of photons have a linear relationship. However, human eyes perceive twice the light (e.g., twice the number of photons) as being less than two times brighter, particularly at higher brightness levels. Said another way, human eyes are more sensitive to changes in darker tones than to changes in brighter tones.

Because of how humans perceive light, in image and video encoding, it is more useful and efficient to have finer gradations at lower brightness levels than at higher brightness levels. Specifically, because small differences in brightness at higher brightness levels are difficult for viewers to perceive, it is efficient to have more values available at a lower end of the brightness spectrum than at a higher end. Gamma encoding allows a smaller number of bits per pixel to be used than if gamma encoding is not used. By contrast, without gamma encoding, an excess of bits may be devoted to describing the brighter tones, and/or a shortage of bits are left to describe the darker tones.

Gamma defines a power-law relationship between actual brightness and a scale used for video encoding. The gamma-encoded video is transmitted to an end device, such as a television, which decodes the gamma-encoded video for display. A standard gamma value for modern display devices is 2.2; images and videos are typically encoded using a gamma of 2.2 (specifically, using the inverse of 2.2, which is approximately 0.4545) and decoded using the same gamma value of 2.2. The 2.2 value is a legacy from cathode ray tubes (CRTs), which had a non-linear response of light intensity to input voltage; encoding video for display on CRTs at 0.45 (the inverse of 2.2) resulted in proper display on a CRT, without decoding the signal.

With modern display devices, using a different gamma value from the encoding value when decoding, or applying a further gamma adjustment to a gamma-decoded image or video, can improve a viewer's perception of the image or video. This gamma adjustment has the most pronounced effect on the overall brightness and contrast within the middle range of brightness. The gamma adjustment does not significantly alter the extreme dark or light areas; thus, adjusting gamma has a different effect from the display brightness and contrast settings described above.

Specifically, adjusting gamma based on the brightness setting of a display device may provide an improved viewer experience. This may be referred to as adaptive gamma, because the gamma adapts dynamically based on a variable display brightness. As display technologies have improved and become brighter, a decoding gamma of 2.2 may no longer be the most comfortable or provide the most natural-seeming image for a user. Instead, using a higher gamma when the display is set to a relatively high brightness can improve viewer experience. As described herein, a display system may determine a brightness setting of a display device, select a gamma adjustment based on the brightness setting, and apply the selected gamma adjustment to content for display. If the display brightness changes, the adaptive gamma may alter or remove the gamma adjustment, e.g., selecting a different gamma value or reverting to a gamma of 2.2.

The display brightness may be adjusted based on ambient brightness, e.g., in response to ambient brightness detected by a sensor on the display. Thus, the gamma adjustment may be directly or indirectly controlled by ambient brightness. In some embodiments, the gamma adjustment may alternatively or additionally be determined based on content type or classification, e.g., whether a video is a movie or sports content.

The gamma adjustment may be applied after the content has been decoded using a standard gamma, e.g., decoding the content using a gamma of 2.2 and then applying a gamma adjustment. Alternatively, the gamma-encoded content may be decoded using the selected gamma, e.g., a gamma higher than 2.2. In some embodiments, a device connected to the display device may perform a gamma adjustment of the encoded content, and then transmit the gamma-adjusted content to a connected display device that decodes the content using a standard gamma. In some embodiments, the gamma may be adapted using a look-up table (LUT), which is referred to herein as a gamma table or gamma LUT, prior to display.

As used herein, content may include any visual information that can be displayed on a display device, such as an image or a video. The content may be encoded in the standard red, green, blue (sRGB) color space, the ITU-R Recommendation 709 (also referred to as Rec.709, BT.709 or ITU 709) color space, the ITU-R Recommendation BT.2020 color space (also referred to as Rec. 2020 or BT.2020), or another color space. Each color space has an associated gamma value and/or gamma function.

As used herein, gamma adjustment may refer to any change in the gamma curve of displayed content. An adaptive gamma may result in shifting the brightness composition of content to a higher gamma curve or a lower gamma curve. Several example processes and formulas for adaptive gamma are provided herein, but it should be understood that alternate processes and/or formulas may be used.

Example Brightness Scales Illustrating Gamma

FIG. 1 depicts two example brightness scales, according to some embodiments of the present disclosure. The first scale 100 illustrates a first set of six different shades associated with different values between 0 and 1. 0 corresponds to black, 1 corresponds to white, and 0.2, 0.4, 0.6, and 0.8 correspond to different shades of gray.

The second scale 110 illustrates a second set of six different shades associated with the same values between 0 and 1, with 0 corresponding to black, 1 corresponding to white, and 0.2, 0.4, 0.6, and 0.8 corresponding to different shades of gray.

In the first scale 100, the gray shade corresponding to 0.2 appears about halfway between white and black, with the shades at 0.4, 0.6, and 0.8 becoming increasingly light. By contrast, in the second scale 110, the mid-tone gray falls around 0.4 and 0.6, and the difference between the tones in the second scale 110 appears more even to a human viewer.

The first scale 100 corresponds to a scale with linearly increasing intensity scale, i.e., linear luminance output, while the second scale 110 corresponds to a scale with linearly increasing encoded luminance signal. Equal steps in gamma-encoded luminance, represented by the second scale 110, correspond to subjectively equal steps in brightness. By contrast, the linear intensity scale, represented by the first scale 100, has a large jump in perceived brightness between the intensity values 0.0 and 0.2, while the steps at the higher end of the scale are less perceptible.

To account for this non-linear relationship between actual brightness (i.e., linear intensity) and perceived brightness, gamma encoding devotes a greater number of bits to graduations at the darker end of the spectrum than at the brighter end of the spectrum. Gamma encoding improves efficiency by allowing a smaller number of bits per pixel to be used than if gamma encoding is not used, while also providing sufficient graduations for describing the darker tones in images and video, as described above.

Example Gamma Curves

As described above, gamma defines a non-linear relationship between a numerical value describing brightness (e.g., a value describing brightness of a pixel) and actual luminance (e.g., actual luminance of the pixel). In gamma encoding, a measured brightness (e.g., luminance detected by a camera or other sensor) is encoded using the following formula:

$$V_{enc} = L^{\gamma_{enc}} \quad (1)$$

where L is an input or measured brightness (e.g., a linear scale luminance), $\gamma_{enc}$ is the encoding gamma, and $V_{enc}$ is the encoded brightness value. The encoding gamma $\gamma_{enc}$ is commonly 0.45 or approximately 0.45; the inverse of a gamma of 2.2 is 45/99 or $0.\overline{45}$.

The inverse of the encoding formula (1) is typically used to decode a gamma-encoded image. A display brightness is decoded using the following formula:

$$V_{dec} = V_{enc}^{\gamma_{dec}} \quad (2)$$

where $\gamma_{dec}$ is the decoding gamma and $V_{dec}$ is the decoded brightness value. If $\gamma_{dec}$ is the inverse of $\gamma_{enc}$ (i.e., $\gamma_{enc}=1/\gamma_{dec}$), the decoded brightness $V_{dec}$ is equal to the linear luminance L.

Figure 2:
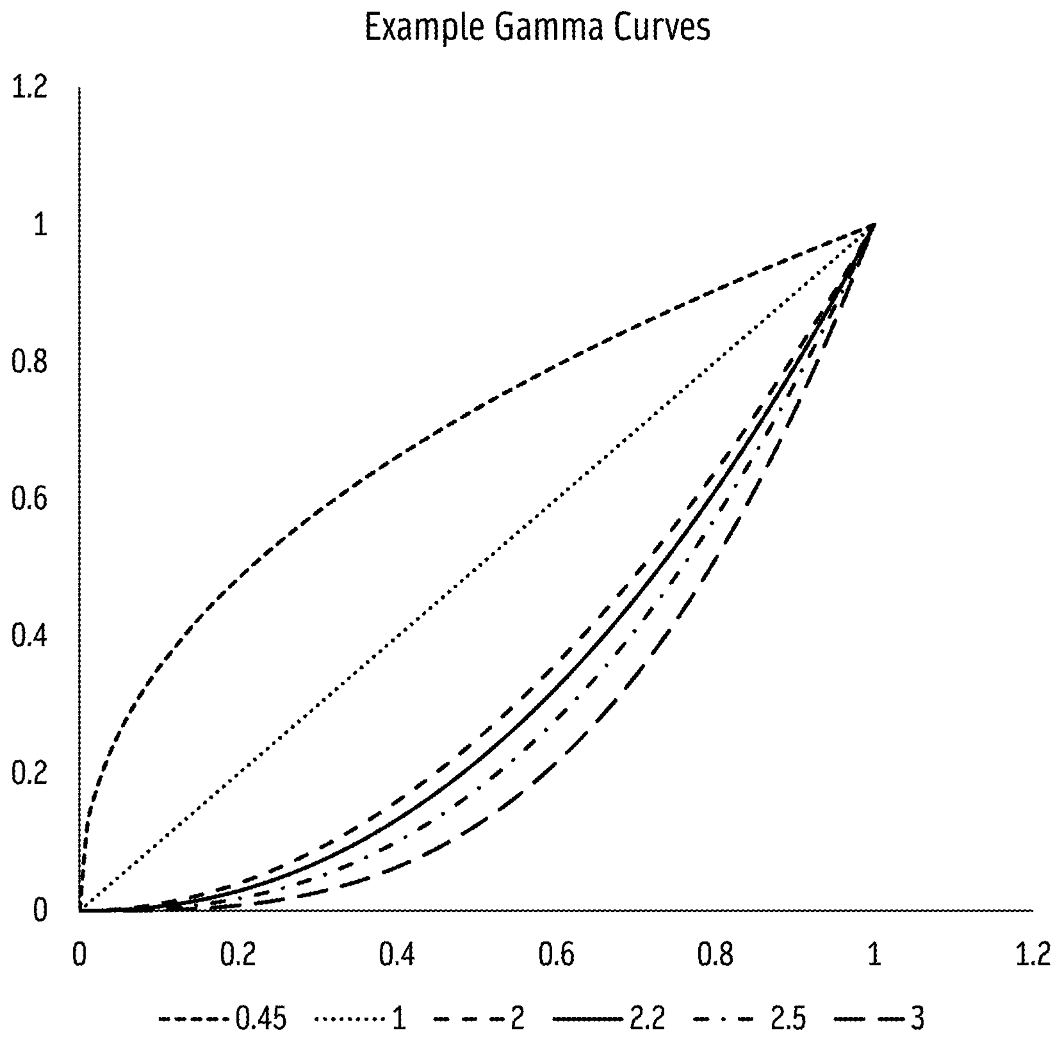
FIG. 2 illustrates different gamma curves relating values to display brightnesses, according to some embodiments of the present disclosure.

FIG. 2 is a graph that illustrates different gamma curves relating input values (e.g., encoded pixel values) to output values (e.g., display brightnesses), according to some embodiments of the present disclosure. The x-axis of FIG. 2 represents an input value, e.g., L in formula (1) or $V_{enc}$ in formula (2). The y-axis of FIG. 2 represents an output value, e.g., $V_{enc}$ in formula (1) or $V_{dec}$ in formula (2). Curves for six gamma values are plotted in the graph. The linear relationship, where the output value is equal to the input value, corresponds to a $\gamma$ of 1. A single curve, corresponding to $\gamma$=0.45, is above the line for $\gamma$=1. The 0.45 $\gamma$ curve represents a typical encoding relationship.

Curves for four example decoding gamma values are illustrated below the line for $\gamma$=1. The solid curve corresponds to $\gamma$=2.2, which as noted above, is a standard decoding gamma. A curve for $\gamma$=2.0. is above the curve for $\gamma$=2.2, and two curves for $\gamma$=2.5 and for $\gamma$=3.0 are below the solid curve for $\gamma$=2.2. As shown in the graph, the distances between the curves for the different decoding gammas are greatest in a central range of input values (e.g., around input values of 0.4-0.8), while the curves are closer together at the ends (e.g., near input values of 0 and 1).

In some encoding standards, the gamma function does not strictly follow one of the example curves illustrated in FIG. 2. For example, an electro-optical transfer function (EOTF) may largely follow a particular gamma curve (e.g., the 2.2 $\gamma$ curve), with a linear portion close to zero, e.g., for input values below 0.018 for Rec. 709. Specifically, in Rec. 709, the encoding EOTF is as follows:

$$V_{enc} = \begin{cases} 4.500L & L < 0.018 \\ 1.099L^{0.45} - 0.099 & L \geq 0.018 \end{cases} \tag{3}$$

The EOTF in formula (3) includes the power function with the 0.45 encoding $\gamma$, described above. However, the overall encoding $\gamma$ in Rec. 709 is approximately 0.5 (i.e., 1/2.0), rather than 0.45 (approximately 1/2.2). Rec. 709 further includes the following decoding function:

$$V_{dec} = \begin{cases} V_{enc}/4.500 & L < 0.081 \\ \left(\frac{V_{enc} + 0.099}{1.099}\right)^{1/0.45} & L \geq 0.081 \end{cases} \tag{4}$$

The decoding function of formula (4) is not an exact inverse of the encoding EOTF. The decoding function of formula (4) is approximately 2.4, which creates an overall gamma shift or system gamma of 1.2. This system gamma is intended to compensate for other aspects of a high-definition television system, such as the dim surround effect. In Rec. 709 and in other standards, even if the system gamma is not 1.0 (i.e., if the decoding gamma is not the inverse of the encoding gamma), the system gamma typically fixed and does not vary based on screen brightness or other factors.

Exemplary Electronic System

Figure 3:
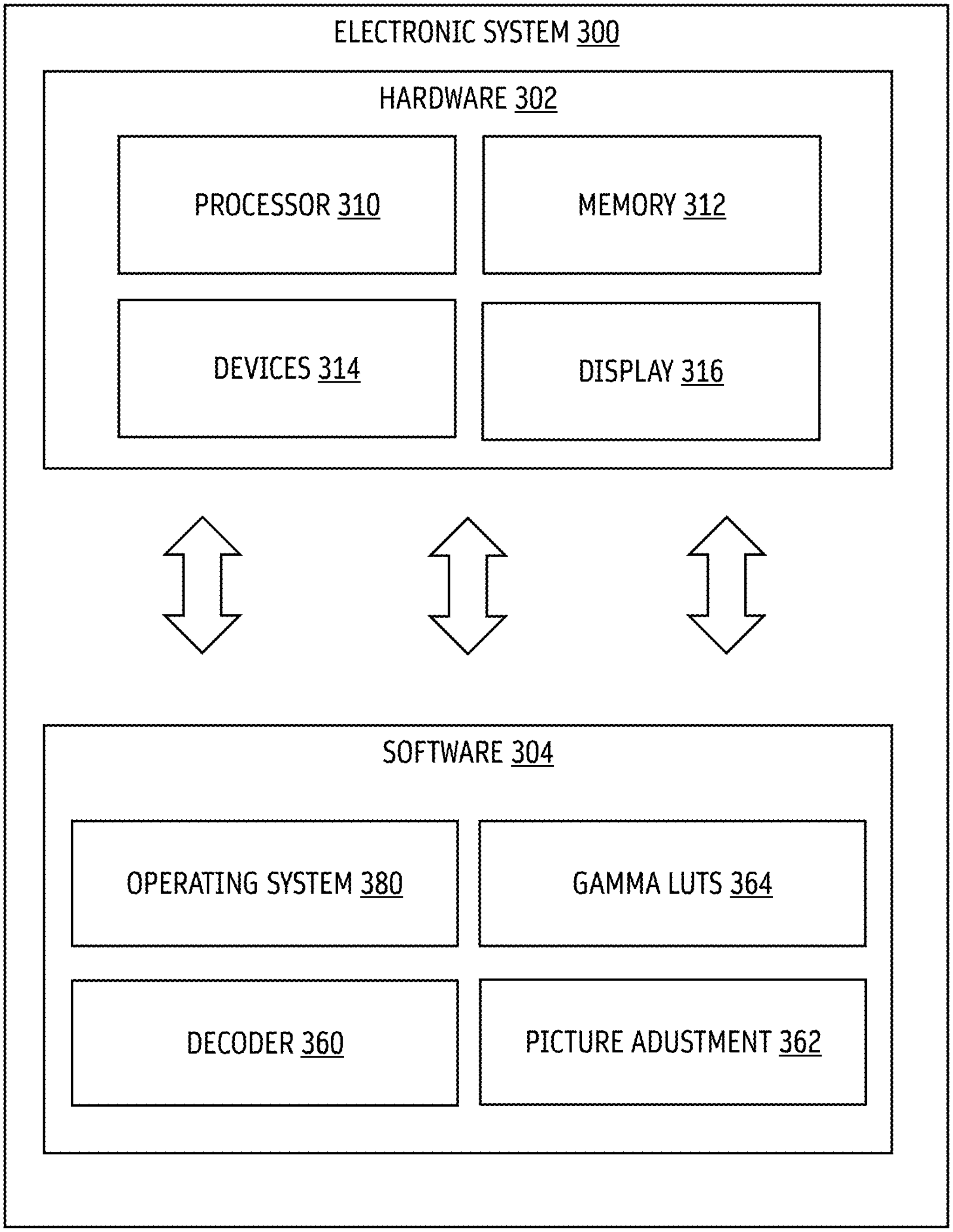
FIG. 3 is a block diagram of exemplary electronic system to implement adaptive gamma according to some embodiments of the disclosure.

FIG. 3 is a block diagram of exemplary electronic system 300 to implement adaptive gamma according to some embodiments of the disclosure. Electronic system 300 may in some cases be in the form of a computing device 1000 of FIG. 10. Electronic system 300 may include hardware 302 and software 304. Hardware 302 can include physical components of electronic system 300. Hardware 302 may include processor 310, memory 312, one or more devices 314, and a display 316. Examples of the one or more devices 314 can include a communication device (e.g., a Wi-Fi adapter or Ethernet adapter), communication interface/controller, cryptography accelerator, decoder, light-emitting device, sensors, input device, output device, media card reader, identity module, etc.

In some embodiments, devices 314 include an ambient light sensor. An ambient light sensor is a photodetector that is configured to sense an amount of ambient light present. For example, the photodetector may include one or more phototransistors and/or one or more photodiodes. The ambient light sensor may be a photonic integrated circuit, which may include a photodetector (e.g., a phototransistor or photodiode) coupled to an amplifier. As described further below, display 316 may be dimmed based on the detected amount of ambient light.

Figure 10:
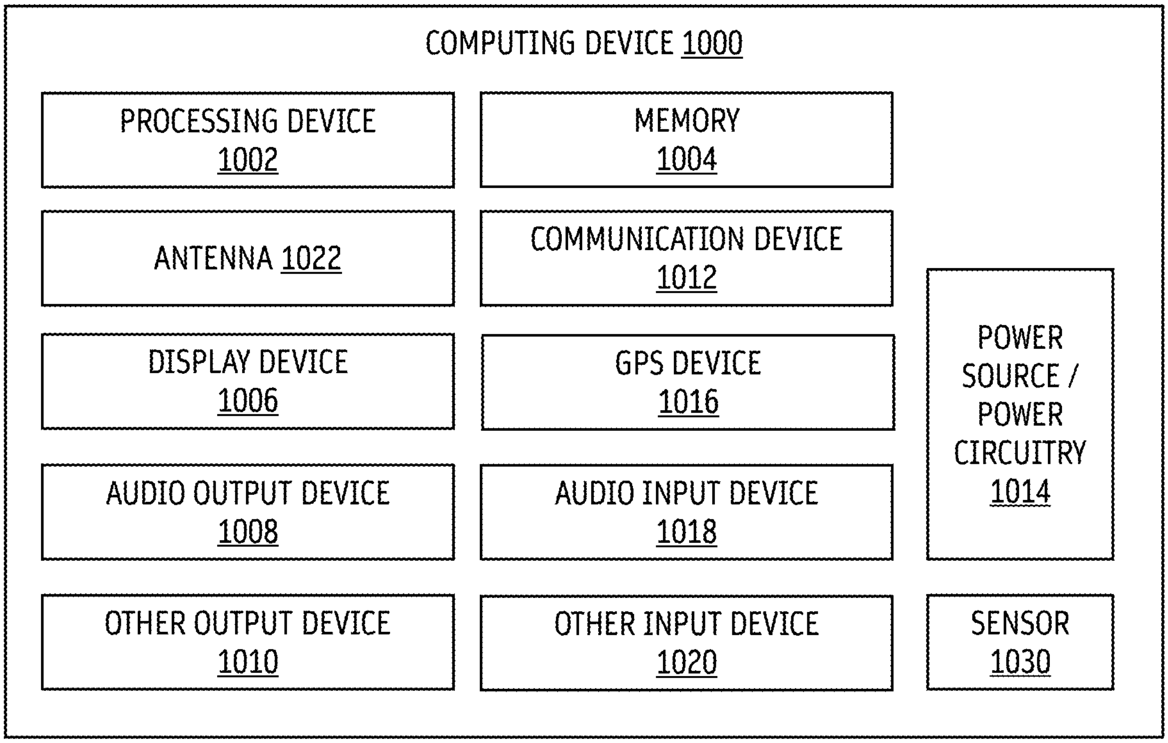
FIG. 10 depicts a block diagram of an exemplary computing device, according to some embodiments of the disclosure.

Processor 310 may be any of the processing devices described in relation to FIG. 10. Processor 310 may be a component of a system on a chip (SoC) that also includes various interfaces (e.g., one or more memory interfaces, communications interfaces, etc.) and/or additional components, such as a graphics processing unit (GPU). The SoC may be coupled to memory 312, and/or the SoC may include an integrated memory. Memory 312 may include a non-volatile memory, such as a flash memory, that stores data describing display 316. For example, memory 312 may store a brightness range of display 316 and/or a maximum brightness of display 316. The maximum display brightness and/or brightness range may be measured in a factory and stored on the non-volatile memory. Memory 312, or a separate memory (e.g., a memory component of processor 310 or the SoC, or a separate memory component coupled to processor 310) may include other forms of memory, as described with respect to FIG. 10.

Display 316 may include any type of display screen, such as a LCD, a light-emitting diode display, or a flat panel display, a heads-up display, a computer monitor, a projector, a touchscreen display, for example. Display 316 may have an adjustable brightness, e.g., the overall amount of light emitted by display 316 may change, e.g., based on ambient brightness, user input, and/or other factors. For example, display 316 may include a backlight that can be dimmed. Alternatively, individual light sources (e.g., LED pixels) may have variable brightness. In some embodiments, electronic system 300 does not include a display 316, and instead includes display device interface circuitry (e.g., a connector and driver circuitry) to which a separate display device may be coupled. An example method for controlling a connected display and, specifically, providing gamma-adjusted content to a connected display, is described with respect to FIG. 9.

Software 304 can include instructions, data, and/or programs that can be executed by a processor (e.g., processor 310) to perform one or more tasks and/or to manipulate one or more components in hardware 302. Software 304 can include operating system 380 and one or more applications. Here, applications include decoder 360 and picture adjustment 362. Decoder 360 receives an encoded video stream and generates video frames. Decoder 360 may perform decompression, e.g., according to a compression standard used for video transmission. In some embodiments, a decoder 360 may not be included, e.g., if the electronic system 300 receives an HDMI input.

Picture adjustment 362 may be capable of changing display settings of display 316. For example, picture adjustment 362 may be programmed to change one or more display characteristics, such as brightness, contrast, color temperature, etc. In addition, picture adjustment 362 may select and apply one of the gamma LUTS 364 to adjust a gamma setting of content. Picture adjustment 362 may receive user input specifying a desired setting for one or more display characteristics. Alternatively or additionally, picture adjustment 362 may adjust one or more settings automatically, based on one or more stimuli. For example, picture adjustment 362 may adjust a brightness setting (e.g., a backlight setting) of display 316 based on an ambient light level detected by a photodetector. As another example, picture adjustment 362 may adjust a brightness setting (e.g., a backlight setting) of display 316 based on electronic system 300 entering a low-power mode, e.g., in response to a low battery level. Picture adjustment 362 may, in turn, select a gamma adjustment based on the brightness setting of display 316. Picture adjustment 362 may process content to apply the selected gamma adjustment and transmit the gamma-adjusted content to display 316, which outputs the content.

In this example, software 304 further includes a set of gamma LUTS 364. Picture adjustment 362 may select a gamma LUT and use the selected gamma LUT to perform gamma adjustments. Each gamma LUT may correspond to a respective gamma value or gamma formula for adjusting gamma of content. In general, a LUT is a data structure that maps input values to corresponding output values, enabling quick data retrieval. A gamma LUT maps input pixel values to output pixel values, e.g., according to the formulas (2) or (4). In some embodiments, each gamma LUT may represent a gamma adjustment between two gamma values, e.g., from 2.2 to 2.4, or from 2.2 to 2.8. In such embodiments, an additional LUT or another module (e.g., firmware of electronic system 300) may provide initial gamma decoding of the content using a standard gamma value (e.g., 2.2), or may provide gamma decoding after an initial adjustment (e.g., as described with respect to FIG. 9). In other embodiments, a selected gamma LUT may be applied to received content, such that one gamma LUT may correspond to the 2.2 $\gamma$ curve, another gamma LUT may correspond to the 2.4 $\gamma$ curve, etc., and applying a standard gamma correction is not needed. Applications, including applications 360 and 362, may be subsystems of electronic system 300. Additional examples of applications may include changing colors of a light bulb based on the time of day, turning on an alarm when a sensor detects unacceptable levels of indoor air pollution, capturing video footage at a front door of a home, tracking health metrics based on sensor data, counting a number of people that has walked past an area, performing inventory counting based on sensor data, monitoring equipment performance based on sensor data, monitoring atmospheric information based on sensor data, etc.

Operating system 380 may include software that manages hardware 302 and other resources in software 304. Operating system 380 can provide services for one or more applications. Operating system 380 can act as an intermediary between an application and hardware 302. Operating system 380 can implement one or more of: process management, memory management, device management, security, and input/output management. Operating system 380 may include one or more libraries corresponding to the one or more services. A library may include a well-defined application programming interface (API). A library may include corresponding implemented functions of the API. An API may include specifications for applications to make a request or call a function. For example, a library may include an API for using a device of the one or more devices 314. An application can open a library to start a service. The application can call a function defined in the library to perform an operation using the service.

Exemplary Flow Diagram for Gamma Encoding and Decoding

Figure 4:
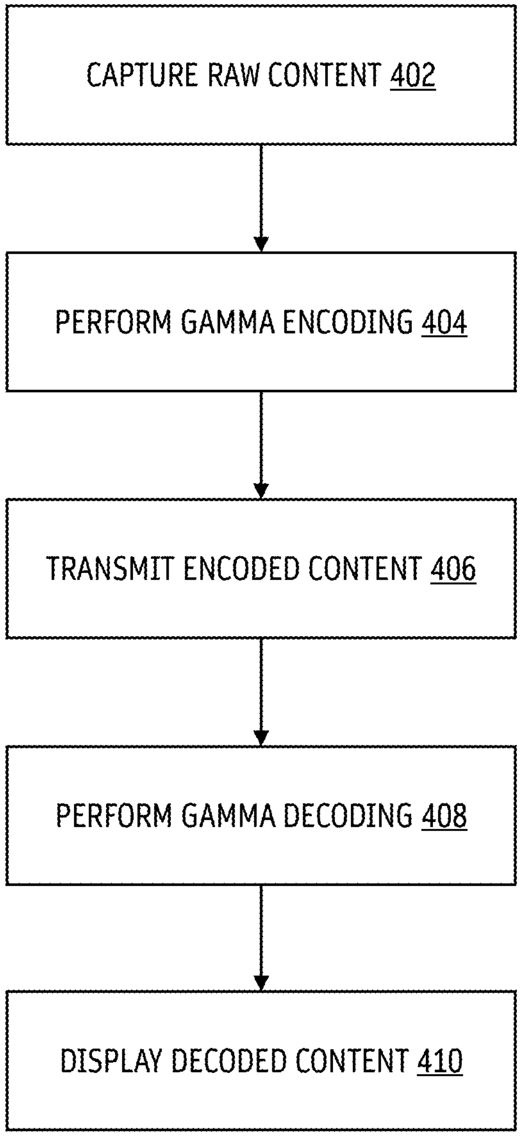
FIG. 4 depicts a flow diagram for content handling and display that includes gamma encoding and gamma decoding, according to some embodiment of the disclosure.

FIG. 4 depicts a flow diagram for content handling and display that includes gamma encoding and gamma decoding, according to some embodiment of the disclosure. In 402, a first device (e.g., a camera) captures raw content, which includes brightnesses measured using a linear luminance scale.

In 404, a video encoder (e.g., a video encoder on the camera, or a separate video encoder processing content received from the camera) performs gamma encoding. The gamma encoding may be performed according to an encoding formula, e.g., formula (1) or (3), discussed in relation to FIG. 2. More generally, the content may be color encoded according to any suitable standard (e.g., sRGB, Rec.709, etc.); additional encoding standards, such as H.26x or MPEG video encoding, may be applied to prepare the content for transmission.

In 406, a content source transmits the encoded content to a device, such as electronic system 300. For example, the content may be transmitted over a wired or wireless connection, as described with respect to the communication device 1012 of FIG. 10.

In 408, the content recipient, e.g., electronic system 300, performs gamma decoding. The gamma decoding may be performed according to a decoding formula, e.g., formula (2) or (4), discussed in relation to FIG. 2. In addition, other aspects of the content may be decoded using an applicable decoding standard, e.g., MPEG or H.26x.

In 410, the content recipient (e.g., electronic system 300) displays the decoded content. For example, the electronic system 300 displays the decoded content on display 316.

Content Handling and Display with Gamma Adjustment

Figure 5:
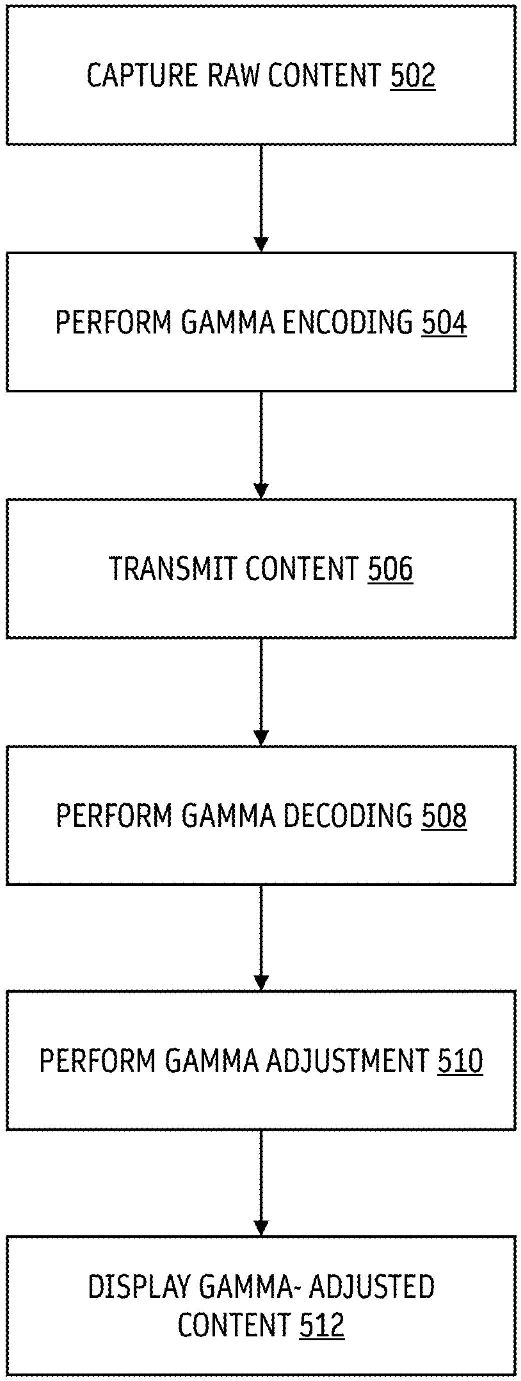
FIG. 5 depicts a flow diagram illustrating exemplary operations for content handling and display that includes gamma adjustment, according to some embodiment of the disclosure.

FIG. 5 depicts a flow diagram illustrating exemplary operations for content handling and display that includes gamma adjustment, according to some embodiment of the disclosure. The flow diagram of FIG. 5 is similar to the flow diagram of FIG. 4, except that FIG. 5 includes applying a gamma adjustment.

In 502, a first device (e.g., a camera) captures raw content, which includes brightnesses measured using a linear luminance scale.

In 504, a video encoder performs gamma encoding. The gamma encoding may be performed according to an encoding formula, e.g., formula (1) or (3), discussed in relation to FIG. 2. The gamma encoding may be the same process as 404 of FIG. 4, described above.

In 506, a content source transmits the encoded content to a device, such as electronic system 300.

In 508, the content recipient, e.g., electronic system 300, performs gamma decoding. The gamma decoding may be performed according to a decoding formula, e.g., formula (2) or (4), discussed in relation to FIGS. 2 and 4.

In 510, the content recipient, e.g., electronic system 300, applies a gamma adjustment. The gamma adjustment may use the decoded brightnesses from 508 as an input to a gamma adjusting formula, e.g., a formula that transforms a brightness from the $\gamma$=2.2 curve to the $\gamma$=2.5 curve, if an overall gamma of 2.5 is desired. For example, the following formula may be used:

$$V_{adj} = V_{dec}^{(1+\gamma_\Delta/\gamma_{dec})} \tag{5}$$

where $V_{adj}$ is the gamma-adjusted brightness, $\gamma_\Delta$ is the gamma adjustment (e.g., +0.3 to transform from the $\gamma$=2.2 curve to the $\gamma$=2.5 curve), and, as in formula (2), $V_{dec}$ is the decoded brightness value (e.g., the decoded brightness from 508) and $\gamma_{dec}$ is the decoding gamma (e.g., 2.2), As another example, the following formula may be used:

$$V_{adj} = V_{dec}^{\gamma_{shift}} \quad (6)$$

where $V_{adj}$ is the gamma-adjusted brightness, $\gamma_{shift}$ is the gamma adjustment (e.g., a gamma shift that may be equal to a ratio between a standard gamma and selected gamma), and, as in formula (2), and $V_{dec}$ is the decoded brightness value (e.g., the decoded brightness from 508). For example, if the original decoding gamma is 2.2, and the desired gamma adjustment moves the brightness to the 2.5 curve, $\gamma_{shift}$ may be equal to 2.5/2.2, or approximately 1.136. Example processes for selecting a gamma adjustment are described below in relation to FIGS. 7 and 8. The gamma adjustments may be applied using a gamma LUT, e.g., a selected one of the gamma LUTs 364. Values in the LUT may be pre-calculated using a formula, e.g., formula (5) or (6).

In some embodiments, processes 508 and 510 are reversed, i.e., a gamma adjustment is applied to received content, and then a gamma decoding (e.g., a standard gamma decoding) is applied to the gamma-adjusted content. For example, gamma decoding may be applied at the display system, after gamma adjustment using a selected gamma LUT 364 by picture adjustment 362.

In 512, the content recipient (e.g., electronic system 300) displays the decoded and gamma-adjusted content. For example, the electronic system 300 displays the decoded content on display 316.

In FIG. 5, the content is decoded and then the gamma is adjusted (or vice versa). In other embodiments, the content is decoded using an adjusted gamma value or adjusted gamma formula. An example of this process is shown in FIG. 6.

Figure 6:
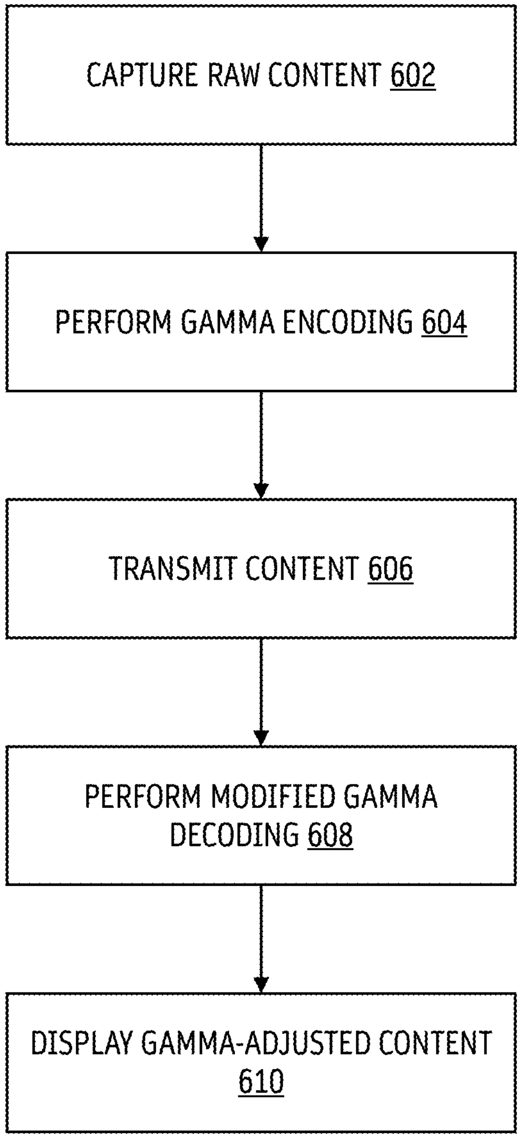
FIG. 6 depicts a flow diagram illustrating exemplary operations for content handling and display that includes an alternate method for gamma adjustment, according to some embodiment of the disclosure.

FIG. 6 depicts a flow diagram illustrating exemplary operations for content handling and display that includes an alternate method for gamma adjustment, according to some embodiment of the disclosure.

In 602, a first device (e.g., a camera) captures raw content, which includes brightnesses measured using a linear luminance scale.

In 604, a video encoder performs gamma encoding. The gamma encoding may be performed according to an encoding formula, e.g., formula (1) or (3), discussed in relation to FIG. 2. The gamma encoding may be the same process as 404 of FIG. 4, described above.

In 606, a content source transmits the encoded content to a device, such as electronic system 300.

In 608, the content recipient, e.g., electronic system 300, performs modified gamma decoding. The modified gamma decoding involves selecting a gamma and decoding the content according to the selected gamma. This is different from the processes 408 or 508, in which a standard gamma decoding process (e.g., using a fixed gamma or a fixed formula) is performed. The result of the modified gamma decoding is gamma-adjusted content, e.g., content that has been gamma-adjusted compared to the inverse of the encoding function.

The gamma decoding may be performed according to a decoding formula, which may include a variable that is based on the selected gamma adjustment. For example, the gamma decoding may use one of a plurality of different gammas, e.g., the $\gamma$=2.2 curve, the $\gamma$=2.5 curve, or the $\gamma$=3.0 curve, depending on the desired gamma. For example, the gamma decoding may follow formula (2), using a selected gamma as $\gamma_{dec}$. Using the selected gamma to decode applies the selected gamma adjustment (e.g., an adjustment of 0.5 when shifting from a gamma of 2.2 to a gamma of 2.7) to the content.

As another example, the following formula may be used:

$$V_{dec} = \begin{cases} 0.1 * (V_{enc} * \gamma_{sel}) & L < 0.081 \\ \left(\dfrac{V_{enc} + 0.099}{1.099}\right)^{\gamma_{sel}} & L \geq 0.081 \end{cases} \quad (7)$$

where $\gamma_{sel}$ is the selected gamma, which incorporates and applies the shift. The gamma adjustments may be applied using a gamma LUT, e.g., a selected one of the gamma LUTs 364. Values in the LUT may be pre-calculated using a formula, e.g., formula (7).

Figure 7:
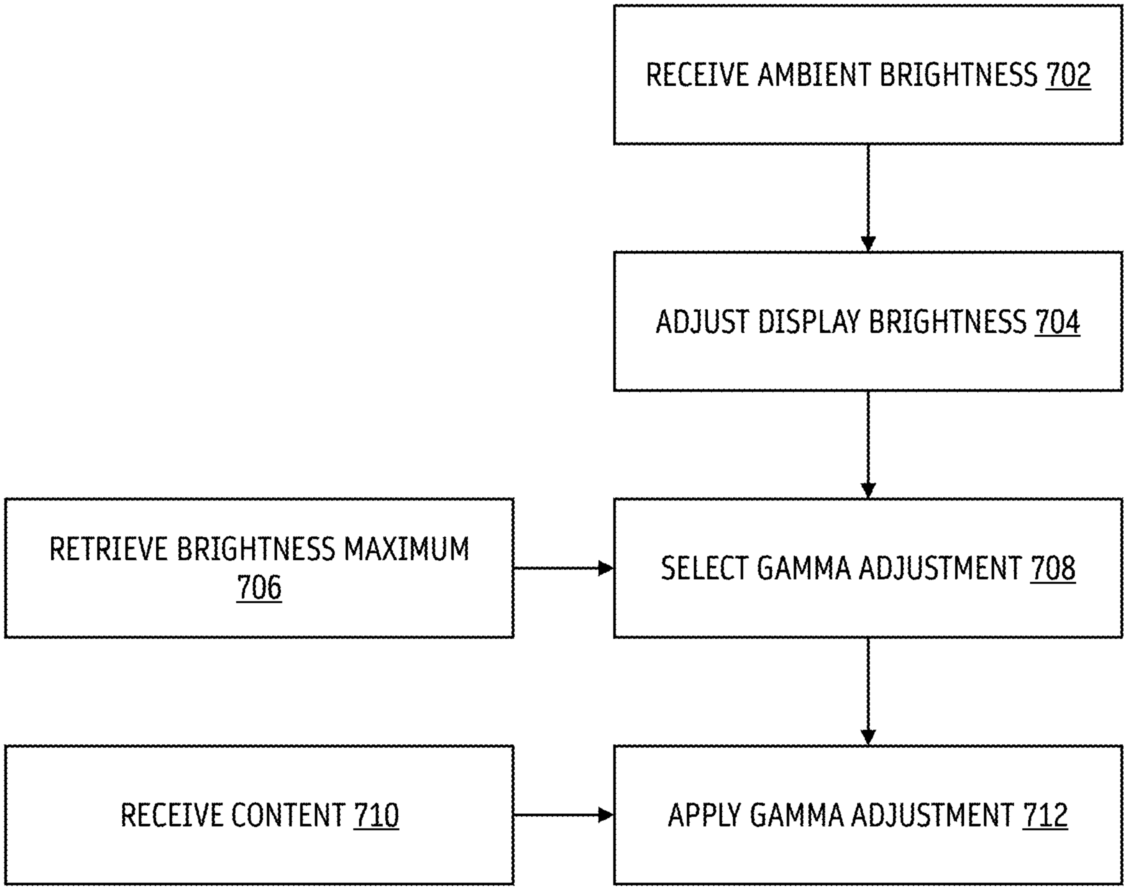
FIG. 7 depicts a flow diagram illustrating exemplary operations for selecting and performing a gamma adjustment based on overall display brightness, according to some embodiments of the disclosure.
Figure 8:
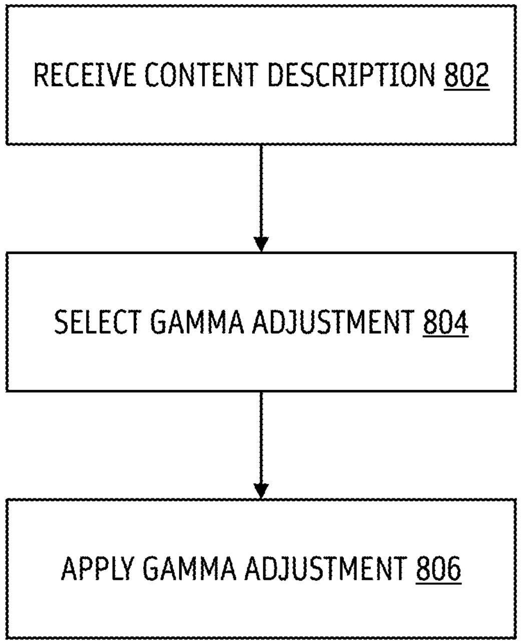
FIG. 8 depicts a flow diagram illustrating exemplary operations for adjusting gamma based on content, according to some embodiments of the disclosure.

As described in relation to FIGS. 7 and 8, electronic system 300 may select a value for gamma based on screen brightness and/or content type.

In 610, the content recipient (e.g., electronic system 300) displays the decoded and gamma-adjusted content. For example, the electronic system 300 displays the decoded content on display 316.

Selecting and Performing Gamma Adjustment

As noted above, the gamma adjustment (e.g., a change in the gamma curve) can be selected based on display brightness and/or other factors, such as content type. FIGS. 7 and 8 illustrate two example methods for performing the gamma adjustment, e.g., for performing process 510 of FIG. 5, or performing process 608 of FIG. 6. In particular, FIGS. 7 and 8 describe two options for selecting a gamma adjustment, which may be applied during the gamma decoding process (as in the example of FIG. 6), or in a separate gamma adjustment process (as in the example of FIG. 5).

Turning first to FIG. 7, FIG. 7 depicts a flow diagram illustrating exemplary operations for selecting and performing a gamma adjustment based on overall display brightness, according to some embodiments of the disclosure.

In 702, a control system for a display device (e.g., processor 310 executing software 304) receives an ambient brightness measurement. The ambient brightness may be detected using an ambient brightness sensor, as described with respect to FIG. 3.

In 704, the control system (e.g., picture adjustment 362) adjusts a display brightness based on the measured ambient brightness. For example, if the ambient brightness is high (e.g., 500 lux), picture adjustment 362 may set the brightness of the display to a high brightness, e.g., 100% of the maximum brightness. As another example, if the ambient brightness is relatively low (e.g., 50 lux), picture adjustment 362 may set the brightness of the display to a lower brightness, e.g., 50% brightness.

In 706, the control system (e.g., picture adjustment 362) retrieves the brightness maximum or brightness range of the display device. As noted with respect to FIG. 3, display 316 has a maximum brightness that may be measured (e.g., during manufacture) and stored in memory 312 of electronic system 300; this maximum brightness is retrieved by a software or firmware module for selecting a gamma adjustment (referred to as a gamma adjustment module); as noted above, this module may be in picture adjustment 362. The brightness setting, determined in 704, may be based on the maximum brightness of the display device, with a brighter display dimming at higher ambient brightness levels.

In 708, the control system (e.g., the gamma adjustment module) selects a gamma adjustment based on the current display brightness determined in 704 and the maximum brightness retrieved in 706. For example, the maximum brightness may be measured in nits, and the current display brightness may provide the brightness as a percentage of the maximum or along some other scale based on the brightness maximum or range. A gamma adjustment module may determine a current brightness (e.g., 50% of a maximum brightness of 700 nits is 350 nits), and based on this brightness, select a gamma or gamma adjustment. For example, if an encoding gamma is 2.2, the gamma adjustment module may select an adjusted gamma of 2.5 or select a gamma adjustment of 0.3 (leading to an adjusted gamma of 2.5).

In some embodiments, an adjusted gamma is selected using a LUT that correlates different brightnesses to different gammas, e.g., to a $\gamma_{sel}$ for use in formula (8) or formula (2), or to a particular one of the gamma LUTS 364. Alternatively, the lookup table may correlate different brightnesses to different gamma adjustment values, e.g., to be added to the inverse of the encoding gamma to determine the adjusted decoding gamma.

In some embodiments, an adjusted gamma is selected using a formula that calculates a gamma or a gamma adjustment based on the display brightness. The formula may calculate a $\gamma_{sel}$ for use in formula (8) or formula (2), or the formula may calculate a gamma adjustment value that can be added to the inverse of the encoding gamma to determine the adjusted decoding gamma. For example, the calculated gamma may be used to select one of the gamma LUTS 364, where different ones of the gamma LUTS 364 correspond to different gamma values.

In general, the LUT or formula for selecting the gamma may correlate a higher brightness to a higher gamma curve. For example, for a display screen with a high maximum brightness (e.g., greater than 500 nits, greater than 700 nits, or greater than 1000 nits), the maximum gamma, corresponding to the maximum brightness, may be at least 2.5, at least 2.7, or at least 3.0. A display screen with a lower maximum brightness may have a lower maximum gamma. For example, 300 nits may be associated with a gamma of 2.4, whether 300 nits is the maximum brightness (e.g., on a lower-brightness display) or a mid-range brightness (e.g., on a higher-brightness display).

In some embodiments, at low brightness levels, the selected gamma may be equal to, or approximately equal to, the encoding gamma. In some embodiments, at low brightness levels, the selected gamma may be less than the encoding gamma. In still other embodiments, at low brightness levels, the selected gamma may be higher than the encoding gamma, but still less than the maximum gamma.

In 710, the control system receives gamma-encoded content. For example, a communication device as described with respect to FIG. 3 receives gamma-encoded video content and passes the received content to processor 310. The content is encoded at a first gamma value, e.g., 2.2.

In 712, the control system (e.g., picture adjustment 362) applies the gamma adjustment of the received content using the selected gamma. Picture adjustment 362 may apply the gamma adjustment using a selected one of the gamma LUTS 364 as described with respect to FIG. 5 or FIG. 6. The gamma adjustment may correspond to a second gamma value different from the first gamma value, e.g., the second gamma value may be greater than 2.2.

After the gamma adjustment has been applied, the display outputs the gamma-adjusted content, e.g., as described with respect to process 512 of FIG. 5, or process 610 of FIG. 6.

FIG. 8 depicts a flow diagram illustrating exemplary operations for adjusting gamma based on content, according to some embodiments of the disclosure.

In 802, a control system for a display device (e.g., picture adjustment 362) receives a content description. For example, a video may be transmitted with video metadata that may include a content type or classification, and/or keywords that indicate the content type. For example, video metadata may indicate if a video is a movie, live sports, news, educational content, documentary, etc.

In 804, the control system (e.g., picture adjustment 362) selects a gamma adjustment based on the content description, e.g., based on a content classifier and/or keyword.

For example, if the content is a sporting event, the gamma adjustment module may select a relatively high gamma (e.g., 2.8), whereas if the content is a movie, the gamma adjustment module may select a lower gamma (e.g., 2.3). The gamma adjustment module may use multiple attributes to select the gamma adjustment. For example, if the content is a movie and a keyword indicates that it is a drama, the gamma adjustment module may select one gamma (e.g., 2.8), whereas if a keyword indicates that it is a comedy, the gamma adjustment module may select a different gamma (e.g., 2.5).

In some embodiments, the gamma adjustment module factors in both the content description and the screen brightness when selecting a gamma adjustment. For example, the gamma adjustment module may select a baseline gamma adjustment based on the content description, and tune the gamma adjustment (e.g., move it higher or lower) based on the screen brightness. As another example, the gamma adjustment module may select a baseline gamma adjustment based on the screen brightness, and tune the gamma adjustment (e.g., move it higher or lower) based on the content description.

In 806, the control system (e.g., picture adjustment 362) applies the gamma adjustment on the received content using the selected gamma. The gamma adjustment module may perform the gamma adjustment using a selected one of the gamma LUTS 364 as described with respect to FIG. 5 or FIG. 6.

After the gamma adjustment has been applied, the display outputs the gamma-adjusted content, e.g., as described with respect to process 512 of FIG. 5, or process 610 of FIG. 6.

Adjusting Gamma in Content Provided to a Separate Display

In the example illustrated in FIG. 3, display 316 is a component of electronic system 300. For example, processor 310 maybe a controller for the electronic system 300, which includes display 316. As noted above, in some embodiments, electronic system 300 may not include display 316, but instead, electronic system 300 is a device (e.g., a video streaming device) that can connect to an external display, but electronic system 300 does not directly control the display. In such embodiments, electronic system 300 may output gamma-encoded content to the external display, and the external display performs the gamma decoding. The external display may decode using a standard decoding value, e.g., the external display may perform gamma decoding using formula (2) and a gamma value of 2.2. In such embodiments, the connected electronic system may pre-adjust the gamma of the content, so that when the external display performs gamma decoding, the overall system produces content having the desired adjusted gamma.

Figure 9:
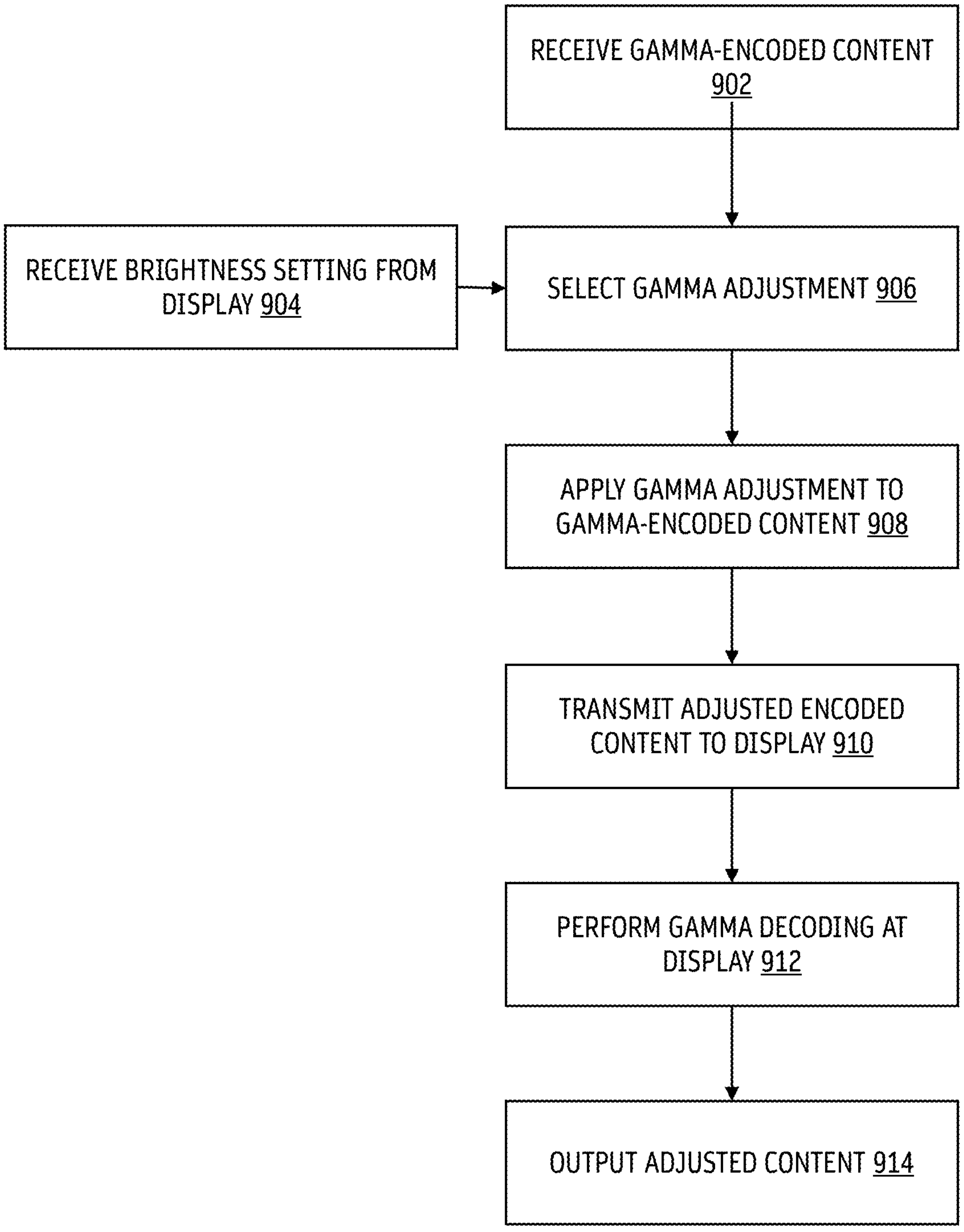
FIG. 9 depicts a flow diagram illustrating exemplary operations for adjusting gamma at a device connected to a separate display device, according to some embodiments of the disclosure.

FIG. 9 depicts a flow diagram illustrating exemplary operations for adjusting gamma at a device connected to a separate display device, according to some embodiments of the disclosure.

In 902, an electronic device connected to a display device receives gamma-encoded content. For example, a communication device as described with respect to FIG. 3 receives gamma-encoded video content and passes the received content to processor 310.

In 904, the electronic device connected to the display device receives a brightness setting from the connected display. The brightness setting may include an actual luminance (e.g., a number of nits), a brightness percentage (e.g., 70% of maximum brightness), or a brightness measured on another scale. The electronic device may also receive a maximum brightness of the display device.

In 906, the electronic device connected to the display device (e.g., decoder 360) selects a gamma adjustment based on the received brightness setting. For example, the electronic device selects a gamma adjustment based on the display brightness, as described with respect to process 708 of FIG. 7.

In 908, the electronic device connected to the display device (e.g., decoder 360) applies the selected gamma adjustment to the gamma-encoded content. In some embodiments, the electronic device applies the gamma adjustment as described with respect to FIG. 5 or FIG. 6. In these examples, the content is gamma-decoded, and the further adjustment is applied, either in the decoding step or after the decoding step. In such embodiments, the electronic device may then re-encode the gamma-adjusted content according to the standard gamma encoding, e.g., using the formula (1) or (3).

In other embodiments, the electronic device (e.g., decoder 360) performs the gamma adjustment without decoding the content. For example, processor 310 may use a gamma LUT 364 representing the formula (5) or (6) to perform a gamma shift of the encoded content.

In 910, the electronic device (e.g., a communication interface of the electronic system 300) transmits the gamma-adjusted and gamma-encoded content to the connected display device.

At 912, the connected display performs gamma decoding using a standard decoding process, e.g., using formula (2).

At 914, the connected display outputs the gamma-adjusted and gamma-decoded content. The displayed content reflects the gamma shift performed by the electronic device connected to the display device.

Example Computing Device

FIG. 10 depicts a block diagram of an exemplary computing device 1000, according to some embodiments of the disclosure. One or more computing devices, such as computing device 1000, may be used to implement the functionalities described with reference to the FIGS. and herein. A number of components are illustrated in the FIGS. as included in computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system on a chip (SoC) die. Additionally, in various embodiments, the computing device 1000 may not include one or more of the components illustrated in FIG. 10, and the computing device 1000 may include interface circuitry for coupling to the one or more components. For example, the computing device 1000 may not include a display device 1006, and may include display device interface circuitry (e.g., a connector and driver circuitry) to which a display device 1006 may be coupled. In another set of examples, the computing device 1000 may not include an audio input device 1018 or an audio output device 1008 and may include audio input or output device interface circuitry (e.g., connectors and supporting circuitry) to which an audio input device 1018 or audio output device 1008 may be coupled.

The computing device 1000 may include a processing device 1002 (e.g., one or more processing devices, one or more of the same type of processing device, one or more of different types of processing device). The processing device 1002 may include electronic circuitry that process electronic data from data storage elements (e.g., registers, memory, resistors, capacitors, quantum bit cells) to transform that electronic data into other electronic data that may be stored in registers and/or memory. Examples of processing device 1002 may include a central processing unit (CPU), a graphical processing unit (GPU), a quantum processor, a machine learning processor, an artificial intelligence processor, a neural network processor, an artificial intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc.

The computing device 1000 may include a memory 1004, which may itself include one or more memory devices such as volatile memory (e.g., DRAM), non-volatile memory (e.g., read-only memory (ROM)), high bandwidth memory (HBM), flash memory, solid state memory, and/or a hard drive. Memory 1004 includes one or more non-transitory computer-readable storage media. In some embodiments, memory 1004 may include memory that shares a die with the processing device 1002. In some embodiments, memory 1004 includes one or more non-transitory computer-readable media storing instructions executable to perform operations described with the FIGS., such as operations described with software 104 (e.g., including one or more of: operating system 180, Application A 160, and Application B 162). The instructions stored in the one or more non-transitory computer-readable media may be executed by processing device 1002. In some embodiments, memory 1004 may store data, e.g., data structures, binary data, bits, metadata, files, blobs, etc., as described with the FIGS. and herein.

In some embodiments, the computing device 1000 may include a communication device 1012 (e.g., one or more communication devices). For example, communication device 1012 may be configured for managing wired and/or wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication device 1012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication device 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication device 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication device 1012 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 1012 may operate in accordance with other wireless protocols in other embodiments. The computing device 1000 may include an antenna 1022 to facilitate wireless communications and/or to receive other wireless communications (such as radio frequency transmissions). The computing device 1000 may include receiver circuits and/or transmitter circuits. In some embodiments, the communication device 1012 may manage wired communications, such as electrical, optical, or any other suitable communication protocols (e.g., the Ethernet). As noted above, communication device 1012 may include multiple communication chips. For instance, a first communication device 1012 may be dedicated to shorter-range wireless communications such as Wi-Fi or Bluetooth, and a second communication device 1012 may be dedicated to longer-range wireless communications such as global positioning system (GPS), EDGE, GPRS, CDMA, WiMAX, LTE, EV-DO, or others. In some embodiments, a first communication device 1012 may be dedicated to wireless communications, and a second communication device 1012 may be dedicated to wired communications.

The computing device 1000 may include power source/power circuitry 1014. The power source/power circuitry 1014 may include one or more energy storage devices (e.g., batteries or capacitors) and/or circuitry for coupling components of the computing device 1000 to an energy source separate from the computing device 1000 (e.g., DC power, AC power, etc.).

The computing device 1000 may include a display device 1006 (or corresponding interface circuitry, as discussed above). Display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing device 1000 may include a GPS device 1016 (or corresponding interface circuitry, as discussed above). The GPS device 1016 may be in communication with a satellite-based system and may receive a location of the computing device 1000, as known in the art.

The computing device 1000 may include a sensor 1030 (or one or more sensors). The computing device 1000 may include corresponding interface circuitry, as discussed above). Sensor 1030 may sense physical phenomenon and translate the physical phenomenon into electrical signals that can be processed by, e.g., processing device 1002. Examples of sensor 1030 may include: capacitive sensor, inductive sensor, resistive sensor, electromagnetic field sensor, light sensor, camera, imager, microphone, pressure sensor, temperature sensor, vibrational sensor, accelerometer, gyroscope, strain sensor, moisture sensor, humidity sensor, distance sensor, range sensor, time-of-flight sensor, pH sensor, particle sensor, air quality sensor, chemical sensor, gas sensor, biosensor, ultrasound sensor, a scanner, etc.

The computing device 1000 may include another output device 1010 (or corresponding interface circuitry, as discussed above). Examples of the other output device 1010 may include an audio codec, a video codec, a printer, a wired or wireless transmitter for providing information to other devices, haptic output device, gas output device, vibrational output device, lighting output device, home automation controller, or an additional storage device.

The computing device 1000 may include another input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1000 may have any desired form factor, such as a handheld or mobile computer system (e.g., a cell phone, a smart phone, a mobile internet device, a music player, a tablet computer, a laptop computer, a netbook computer, a personal digital assistant (PDA), an ultramobile personal computer, a remote control, wearable device, headgear, eyewear, footwear, electronic clothing, etc.), a desktop computer system, a server or other networked computing component, a printer, a scanner, a monitor, a set-top box, an entertainment control unit, a vehicle control unit, a digital camera, a digital video recorder, an Internet-of-Things device (e.g., light bulb, cable, power plug, power source, lighting system, audio assistant, audio speaker, smart home device, smart thermostat, camera monitor device, sensor device, smart home doorbell, motion sensor device), a virtual reality system, an augmented reality system, a mixed reality system, or a wearable computer system. In some embodiments, the computing device 1000 may be any other electronic device that processes data.

SELECT EXAMPLES

Example 1 provides a method including receiving content for display on a display device, the content encoded at a first gamma value; determining a brightness setting of the display device; selecting a gamma adjustment for displaying content based on the brightness setting, the gamma adjustment corresponding to a second gamma value different from the first gamma value; applying the selected gamma adjustment to the content to generate gamma-adjusted content; and displaying the gamma-adjusted content on the display device.

Example 2 provides the method of example 1, further including decoding the content according to the first gamma value; where the selected gamma adjustment is applied to the content decoded according to the first gamma value.

Example 3 provides the method of example 1 or 2, where the second gamma value is greater than the first gamma value.

Example 4 provides the method of example 3, where the first gamma value is 2.2, and the second gamma value is greater than 2.2.

Example 5 provides the method of any preceding example, where the brightness setting is a first brightness setting and the gamma adjustment is a first gamma adjustment, the method further including receiving a second brightness setting of the display device; and selecting a second gamma adjustment different from the first gamma adjustment, the second gamma adjustment corresponding to a third gamma value different from the second gamma value.

Example 6 provides the method of example 5, where the second brightness setting is lower than the first brightness setting, and the third gamma value is equal to the first gamma value.

Example 7 provides the method of any preceding example, further including receiving a classification describing the received content; and selecting the gamma adjustment further based on the classification.

Example 8 provides the method of any preceding example, where selecting the gamma adjustment includes calculating the gamma adjustment using a formula having the brightness setting as a variable.

Example 9 provides the method of any of examples 1-7, where selecting the gamma adjustment includes accessing a lookup table relating a plurality of brightness settings to a plurality of gamma adjustments.

Example 10 provides the method of any preceding example, further including retrieving a maximum brightness for the display device; where a maximum gamma adjustment is based on the maximum brightness for the display device.

Example 11 provides a method including receiving encoded content, the encoded content encoded at a first gamma value; receiving a brightness setting of a display device for displaying the content; selecting a gamma adjustment for the encoded content based on the brightness setting, the gamma adjustment corresponding to a second gamma value different from the first gamma value; applying the selected gamma adjustment to the content to generate gamma-adjusted content; and transmitting the gamma-adjusted content to the display device.

Example 12 provides the method of example 11, where the gamma-adjusted content is gamma-encoded, and the display device is configured to decode received content using the first gamma value.

Example 13 provides the method of example 11 or 12, where applying the selected gamma adjustment to the content includes decoding the content according to the first gamma value; applying the selected gamma adjustment according to the second gamma value to the decoded content to generate gamma-adjusted content; and encoding the gamma-adjusted content according to the first gamma value.

Example 14 provides the method of any of examples 11-13, further including receiving a maximum brightness for the display device; and selecting a gamma adjustment for the encoded content further based on the maximum brightness.

Example 15 provides a device including a display screen; and a processing component coupled to the display screen, the processing component to: receiving a brightness setting of the display screen; select a gamma setting based on the brightness setting; receive content encoded according to a gamma value different from the gamma setting; apply the gamma setting to the content to generate gamma-adjusted content; and output the gamma-adjusted content to the display screen.

Example 16 provides the device of example 15, where the processing component is a system on a chip (SoC) coupled to the display screen.

Example 17 provides the device of example 15 or 16, where the processing component is further to: decode the content according to first gamma value; where applying the gamma setting includes adjusting brightness levels of the content decoded according to the first gamma value.

Example 18 provides the device of one of examples 15-17, where the display screen has a maximum brightness, and the gamma setting is further based on the maximum brightness of the display screen.

Example 19 provides the device of example 18, where the maximum brightness is stored on a memory component of the device.

Example 20 provides the device of one of examples 15-19, where the content has an associated content classifier, and the gamma setting is selected further based on the associated content classifier.

Example 21 provides one or more non-transitory computer-readable media storing instructions executable to perform operations, the operations including receiving content for display on a display device, the content encoded at a first gamma value; determining a brightness setting of the display device; selecting a gamma adjustment for displaying content based on the brightness setting, the gamma adjustment corresponding to a second gamma value different from the first gamma value; applying the selected gamma adjustment to the content to generate gamma-adjusted content; and displaying the gamma-adjusted content on the display device.

Example 22 provides the one or more non-transitory computer-readable media of example 21, where the operations further include decoding the content according to the first gamma value; where the selected gamma adjustment is applied to the content decoded according to the first gamma value.

Example 23 provides the one or more non-transitory computer-readable media of example 21 or 22, where the second gamma value is greater than the first gamma value.

Example 24 provides the one or more non-transitory computer-readable media of example 23, where the first gamma value is 2.2, and the second gamma value is greater than 2.2.

Example 25 provides the one or more non-transitory computer-readable media of any of examples 21-24, where the brightness setting is a first brightness setting and the gamma adjustment is a first gamma adjustment, the method further including receiving a second brightness setting of the display device; and selecting a second gamma adjustment different from the first gamma adjustment, the second gamma adjustment corresponding to a third gamma value different from the second gamma value.

Example 26 provides the one or more non-transitory computer-readable media of example 25, where the second brightness setting is lower than the first brightness setting, and the third gamma value is equal to the first gamma value.

Example 27 provides the one or more non-transitory computer-readable media of any of examples 21-26, further including receiving a classification describing the received content; and selecting the gamma adjustment further based on the classification.

Example 28 provides the one or more non-transitory computer-readable media of any of examples 21-27, where selecting the gamma adjustment includes calculating the gamma adjustment using a formula having the brightness setting as a variable.

Example 29 provides the one or more non-transitory computer-readable media of any of examples 21-27, where selecting the gamma adjustment includes accessing a lookup table relating a plurality of brightness settings to a plurality of gamma adjustments.

Example 30 provides the one or more non-transitory computer-readable media of any of examples 21-29, further including retrieving a maximum brightness for the display device; where a maximum gamma adjustment is based on the maximum brightness for the display device.

Example 31 provides one or more non-transitory computer-readable media storing instructions executable to perform operations, the operations including receiving encoded content, the encoded content encoded at a first gamma value; receiving a brightness setting of a display device for displaying the content; selecting a gamma adjustment for the encoded content based on the brightness setting, the gamma adjustment corresponding to a second gamma value different from the first gamma value; applying the selected gamma adjustment to the content to generate gamma-adjusted content; and transmitting the gamma-adjusted content to the display device.

Example 32 provides the one or more non-transitory computer-readable media of example 31, where the gamma-adjusted content is gamma-encoded, and the display device is configured to decode received content using the first gamma value.

Example 33 provides the one or more non-transitory computer-readable media of example 31 or 32, where applying the selected gamma adjustment to the content includes decoding the content according to the first gamma value; applying the selected gamma adjustment according to the second gamma value to the decoded content to generate gamma-adjusted content; and encoding the gamma-adjusted content according to the first gamma value.

Example 34 provides the one or more non-transitory computer-readable media of any of examples 31-33, further including receiving a maximum brightness for the display device; and selecting a gamma adjustment for the encoded content further based on the maximum brightness.

Example A provides one or more non-transitory computer-readable media storing instructions that, when executed by one or more processors, cause the one or more processors to perform any one of the methods described herein.

Example B provides an apparatus comprising means to carry out or means for carrying out any one of the methods provided in examples 1-34, and/or any one of the methods described herein.

Example C provides a computer-implemented system, comprising one or more processors, and one or more non-transitory computer-readable media storing instructions that, when executed by the one or more processors, cause the one or more processors to perform any one of the methods provided in examples 1-34 and/or any one of the methods described herein.

Example D provides a computer-implemented system comprising one or more components illustrated in FIG. 3 to perform operations described herein.

Example E provides a computing device comprising one or more components illustrated in FIG. 10 to perform operations described herein.

Variations and Other Notes

The description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the above detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

The invention claimed is:

1. A method comprising:
receiving content for display on a display device, the content encoded at a first gamma value;
determining a brightness setting related to an amount of light output by the display device;
selecting a gamma adjustment for displaying content based on the brightness setting, the gamma adjustment corresponding to a second gamma value different from the first gamma value;
decoding the content according to the first gamma value;
applying the selected gamma adjustment to the content to generate gamma-adjusted content, wherein the selected gamma adjustment is applied to the content decoded according to the first gamma value; and
displaying the gamma-adjusted content on the display device.

2. The method of claim 1, wherein the second gamma value is greater than the first gamma value.

3. The method of claim 2, wherein the first gamma value is 2.2, and the second gamma value is greater than 2.2.

4. The method of claim 1, wherein the brightness setting is a first brightness setting and the gamma adjustment is a first gamma adjustment, the method further comprising:
receiving a second brightness setting of the display device; and
selecting a second gamma adjustment different from the first gamma adjustment, the second gamma adjustment corresponding to a third gamma value different from the second gamma value.

5. The method of claim 4, wherein the second brightness setting is lower than the first brightness setting, and the third gamma value is equal to the first gamma value.

6. The method of claim 1, further comprising:
receiving a classification describing the received content; and
selecting the gamma adjustment further based on the classification.

7. The method of claim 1, wherein selecting the gamma adjustment comprises calculating the gamma adjustment using a formula having the brightness setting as a variable.

8. The method of claim 1, wherein selecting the gamma adjustment comprises accessing a lookup table relating a plurality of brightness settings to a plurality of gamma adjustments.

9. The method of claim 1, further comprising:
retrieving a maximum brightness for the display device;
wherein a maximum gamma adjustment is based on the maximum brightness for the display device.

10. A method comprising:
receiving encoded content, the encoded content encoded at a first gamma value;
receiving a brightness setting related to an amount of light output by a display device for displaying the content;
selecting a gamma adjustment for the encoded content based on the brightness setting, the gamma adjustment corresponding to a second gamma value different from the first gamma value;
applying the selected gamma adjustment to the encoded content to generate gamma-adjusted content; and
transmitting the gamma-adjusted content to the display device, wherein the gamma-adjusted content is gamma-encoded, and the display device is configured to decode received content using the first gamma value.

11. The method of claim 10, wherein applying the selected gamma adjustment to the content comprises:
decoding the content according to the first gamma value;
applying the selected gamma adjustment according to the second gamma value to the decoded content to generate gamma-adjusted content; and
encoding the gamma-adjusted content according to the first gamma value.

12. The method of claim 10, further comprising:
receiving a maximum brightness for the display device; and
selecting the gamma adjustment for the encoded content further based on the maximum brightness.

13. The method of claim 10, wherein the gamma adjustment is a first gamma adjustment, the method further comprising:
receiving a second brightness setting of the display device; and
selecting a second gamma adjustment different from the first gamma adjustment, the second gamma adjustment corresponding to a third gamma value different from the second gamma value.

14. A device comprising:
a display screen; and
a processing component coupled to the display screen, the processing component to:
receiving a first brightness setting of the display screen, the first brightness setting related to an amount of light output by the display screen;
select a first gamma setting based on the first brightness setting;
receive content encoded according to a gamma value different from the first gamma setting;
apply the first gamma setting to the content to generate first gamma-adjusted content;
output the first gamma-adjusted content to the display screen;
receive a second brightness setting of the display screen;
select a second gamma setting different from the first gamma setting;

apply the second gamma setting to the content to generate second gamma-adjusted content; and output the second gamma-adjusted content to the display screen.

15. The device of claim 14, wherein the processing component is a system on a chip (SoC) coupled to the display screen.

16. The device of claim 14, wherein the processing component is further to:

decode the content according to the gamma value;

wherein applying the first gamma setting comprises adjusting brightness levels of the content decoded according to the gamma value.

17. The device of claim 14, wherein the display screen has a maximum brightness, and the first gamma setting is further based on the maximum brightness of the display screen.

18. The device of claim 17, wherein the maximum brightness is stored on a memory component of the device.

19. The device of claim 14, wherein the content has an associated content classifier, and the first gamma setting is selected further based on the associated content classifier.

20. The device of claim 14, wherein the gamma value is a first gamma value, the first gamma setting corresponds to a second gamma value different from the first gamma value, and the second gamma setting corresponds to a third gamma value different from the second gamma value.

* * * * *